United States Patent [19]

Kadomatsu et al.

[11] Patent Number: 4,587,699

[45] Date of Patent: May 13, 1986

[54] ELASTIC DEVELOPER CARRIER

[75] Inventors: Yasuo Kadomatsu, Yokohama; Shoji Tajima, Higashikanamachi; Yoshio Miyazaki, Funabashi; Kimio Anze, Kawasaki; Michikazu Sakurai, Yokohama, all of Japan

[73] Assignee: Ricoh Company, Ltd., Japan

[21] Appl. No.: 658,197

[22] Filed: Oct. 5, 1984

[30] Foreign Application Priority Data

Oct. 6, 1983 [JP] Japan ................................ 58-186026
Oct. 11, 1983 [JP] Japan ................................ 58-188309

[51] Int. Cl.[4] ................................................ A01B 29/00

[52] U.S. Cl. ...................................... 29/121.1; 29/115; 29/130; 29/132; 428/328; 428/336; 428/463; 428/469; 428/693; 428/900; 428/926

[58] Field of Search ....................... 29/121.1, 115, 130, 29/132; 428/328, 336, 463, 469, 693, 900, 926

*Primary Examiner*—Bernard D. Pianalto
*Attorney, Agent, or Firm*—Guy W. Shoup

[57] ABSTRACT

An elastic developer carrier for use in a developing device for developing an electrostatic latent image formed on a photosensitive member includes an electrically conductive support, a rubber magnet layer formed on the support and magnetized in a desired pattern having alternating N and S poles, and an electrode layer formed on the rubber magnet layer having a plurality of electrode particles electrically isolated from one another and partly exposed at its outer surface. In another embodiment, an intermediate dielectric layer is provided as sandwiched between the rubber magnet and electrode layers. These developer carriers may be made much lighter in weight and used with a relatively hard photosensitive member without causing a deterioration in developing performance. Novel processes for fabricating these developer carriers are also provided.

12 Claims, 22 Drawing Figures

ELASTIC DEVELOPER CARRIER

BACKGROUND OF THE INVENTION

1. Field of the Invention

This invention generally relates to a developing device for use in developing a latent image in an image processing machine, such as a copier, printer and facsimile machine, and in particular to a developer carrier for use in such a developing device and process for manufacturing such a developer carrier. More specifically, the present invention relates to an elastic developer carrier to be incorporated in a developing device for carrying thereon a film of toner to be applied to an electrostatic latent image formed on an imaging member, such as a photosensitive member, for development of the same and a process for manufacturing such an elastic developer carrier.

2. Description of the Prior Art

In an electrostatic recording apparatus, such as an electrophotographic copier, printer and facsimile machine, different developing characteristics are required depending on the kind of an original as to whether the original mainly consists of a line image or an area image. FIG. 1 is a graph showing ideal developing characteristics in which the abscissa is taken for the density of original image and the ordinate is taken for the density of copy image. In the graph of FIG. 1, the solid curve A indicates an ideal characteristic for an original mainly consisting of an area image; on the other hand, the dotted curve B indicates an ideal characteristic for an original mainly consisting of a line image. As seen easily, the curve B for a line image original is steeper in rising slope as compared with the curve A for an area image original. This is based on the fact that in the case of an original consisting of a line image, it is normally required to increase the image density of copied image even if the image density of original image is relatively lower. On the other hand, in the case of an original consisting of an area image, it is normally required that the image density of copied image is substantially proportional to the image density of original image.

In increasing the image density of copy image in the case of a line image original, the so-called edge effect has been typically used. The edge effect is a phenomenon in which the electric field strength is locally increased at the periphery of an electrostatic latent image as compared with the central portion thereof so that more toner may be attracted to the peripheral portion of the latent image. Thus, in the case of a line image original, since almost all of the region defining the image corresponds to the peripheral portion thereby receiving an increased amount of toner so that the image density may be increased when developed. Such an edge effect has been sufficiently attained in a system using a conventional two-component developer including toner and iron powder. However, in a system using a single-component toner, or magnetic toner, there has been difficulty in obtaining such an edge effect to a sufficient degree.

Under the circumstances, there has been proposed a novel developer carrier allowing to obtain such an edge effect sufficiently even using a single-component developer as disclosed in Japanese Patent Application No. 55-185726, which has been assigned to the assignee of this application. As shown in FIG. 2, the developer carrier proposed in the above-mentioned application includes an electrically conductive, cylindrical support 1 and an electrode layer 2 formed on the support 1 such that a plurality of semi-spherical electrode particles 2*a* are provided as electrically isolated from one another as partly embedded in a dielectric material as partly exposed at an outer peripheral surface. When incorporated into a developing device, a magnet roll 3 is fitted into the cylindrical support 1 so as to form a magnetic force line at the outer peripheral surface of the developer carrier thereby causing magnetic toner to be magnetically attracted to the outer peripheral surface. Typically, the magnet roll 3 is so supported that it can be driven to rotate independently of the developer carrier.

Such a structure allows to obtain the ideal developing characteristics depending on the kind of originals to be copied as shown in FIG. 1. However, such a structure also suffers from other disadvantages. That is, in order to obtain a sufficient magnetic force at the outer peripheral surface of the developer carrier, the magnet roll 3 tends to become larger in size, which, in turn, causes the entire developing device to be rather bulky. Besides, a gap G between the magnet roll 3 and the inner surface of the cylindrical support 1 must be properly adjusted and maintained so as to form a film of toner uniform in thickness on the outer peripheral surface of the developer carrier. Uniformity in such a film of toner is important in maintaining uniformity in developing performance across the entire outer peripheral surface of the developer carrier. It will be easily understood that a narrow tolerance for gap G presents difficulty in assembling the present developer carrier into a developing device, which could also push up the cost. Besides, the embedded depth $t_{2A}$ of each of electrode particles 2*a* is required to fall on a certain range in order to attain the desired edge effect, which cannot be realized without special considerations.

SUMMARY OF THE INVENTION

It is therefore a primary object of the present invention to obviate the disadvantages of the prior art as described above and to provide an improved developer carrier which can be advantageously used in a developing device employing a so-called single component developer and a process for manufacturing such a developer carrier.

Another object of the present invention is to provide a novel developer carrier light in weight, easy for incorporation into a developing device and low in manufacturing cost.

A further object of the present invention is to provide a novel developer carrier high in developing characteristic and a process for manufacturing the same.

A still further object of the present invention is to provide an improved developer carrier which may be used with an image bearing member bearing thereon a latent image to be developed and having a relatively hard surface to which the present developer carrier is brought into contact.

Other objects, advantages and novel features of the present invention will become apparent from the following detailed description of the invention when considered in conjunction with the accompanying drawings.

DESCRIPTION OF THE PREFERRED EMBODIMENTS

Figure 3:
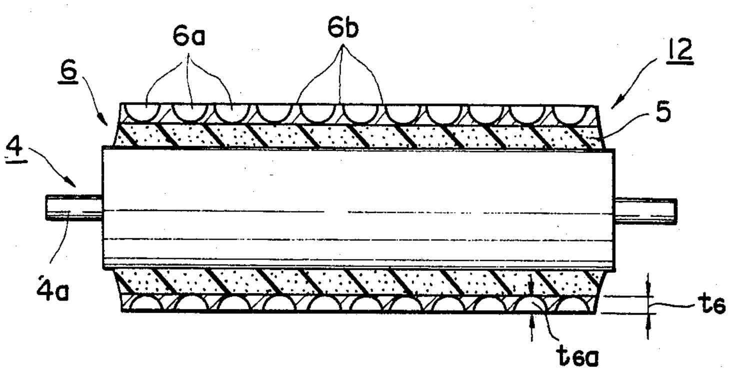
FIG. 3 is a longitudinal, cross-sectional view showing the overall structure of a developer carrier constructed in accordance with one embodiment of the present invention.

Referring now to the drawings, the present invention will be described in detail by way of specific embodiments. FIG. 3 is a longitudinal, cross-sectional view schematically showing the overall structure of an elastic developer carrier constructed in accordance with one embodiment of the present invention. As shown, the present developer carrier includes a columnar support 4 in the form of a roll comprised of an electrically conductive material, such as aluminum and stainless steel. The columnar support 4 is integrally provided with a pair of end shafts 4*a*, 4*a*, each at each end face of the support 4. On the outer peripheral surface of the columnar support 4 is formed a rubber magnet layer 5 which is comprised of a rubber material, such as acrylonitrile-butadiene rubber (NBR), and a magnetic material, such as ferrite, mixed in the rubber material and which is magnetized in alternating polarities at a predetermined pitch in the circumferential direction. Thus, N and S poles extend uniformly along the longitudinal direction and they alternate along the circumferential direction. It is to be noted that the conductive support 4 may take any other form such as an endless belt instead of a columnar shape as in the present embodiment.

On the rubber magnet layer 5 is formed an electrode layer 6 which includes a plurality of substantially semispherical electrode particles 6*a* of electrically conductive material and a dielectric, adhesive agent 6*b*. In the present embodiment, the electrode particles 6*a* are comprised of copper and they are provided as embedded in the dielectric, adhesive agent 6*b* as electrically isolated from one another and partly exposed at an outer peripheral surface of the electrode layer 6. In the preferred embodiment, the copper electrode particles 6*a* are precoated with an electrically insulating material at least prior to a step of being used to form the electrode layer 6. Thus, it is insured that each of the electrode particles 6*a* is in an electrically floating state. Preferably, use is made of a low-temperature hardening adhesive agent as the dielectric, adhesive agent 6*b*; for example, use may be preferably made of acrylicurethane. In the present embodiment, the electrode layer 6 is formed to have a uniform thickness $t_6$ and each of the electrode particles 6*a* is provided as embedded in the electrode layer 6 in contact with the outer peripheral surface of the underlying rubber magnet layer 5, so that the embedded depth $t_{6a}$ of each of the electrode particles is equal to the thickness $t_6$ of electrode layer 6.

Figure 1:
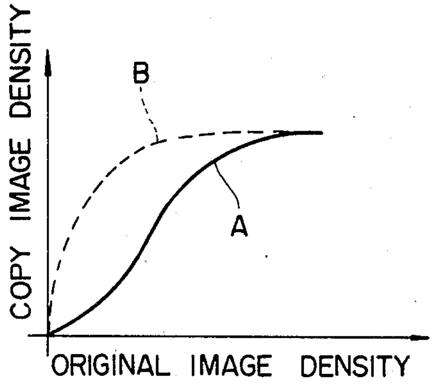
FIG. 1 is a graph showing ideal developing characteristics normally required to develop a latent image.
Figure 2:
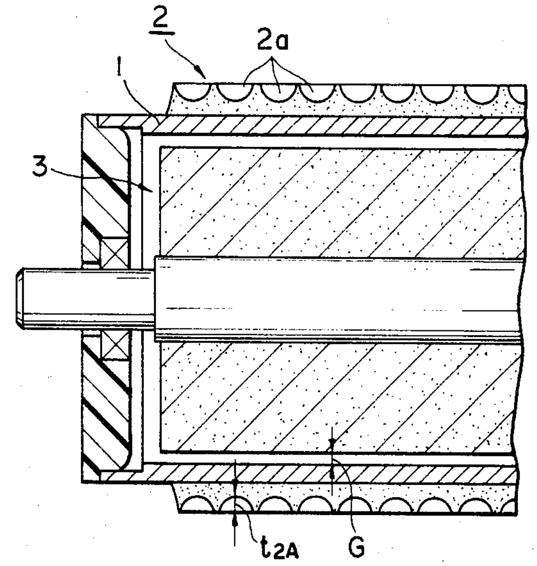
FIG. 2 is a schematic illustration showing the structure of a prior art developer carrier provided with a plurality of floating electrodes at its outer peripheral surface so as to attain the ideal developing characteristics shown in FIG. 1.
Figure 4:
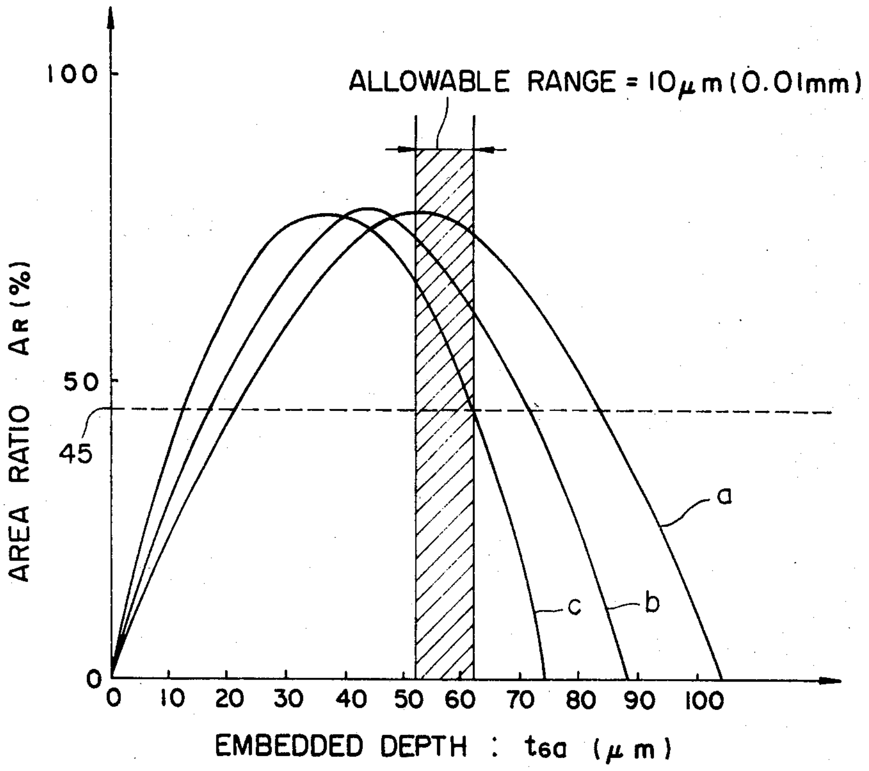
FIG. 4 is a graph showing a relation between the embedded depth of an electrode particle and the area ratio between a total area of exposed portions of floating electrodes and a total area of the outer peripheral surface of the developer carrier.

As will be described in detail below, the thickness $t_6$ of electrode layer 6 is required to fall in a range between 52 and 62 microns if the spherical electrode particles 6*a* used have the diameter ranging between 74 and 104 microns. Such a thickness requirement will be explained with particular reference to FIG. 4 which shows a relation between the embedded depth $t_{6a}$ of each electrode particle 6*a* and the area ratio $A_R$ between a total area of exposed portions of the electrode particles 6*a* and a total area of the outer peripheral surface of electrode layer 6. In the graph of FIG. 4 are shown three curves a, b and c for largest-sized particles of 104 microns in diameter, average-sized particles and smallest-sized particles of 74 microns in diameter, respectively. As may be easily seen from this graph, in order to secure the area ratio of 45% or more, which is necessary to obtain the ideal developing characteristics as shown in FIG. 1 with the production of desired edge effect, the upper limit for the embedded depth $t_{6a}$ is determined to be 62 microns by an intersection between the 45% area ratio line and curve c for the smallest-sized particles. On the other hand, the lower limit for the embedded depth $t_{6a}$ is determined from the consideration as to anchoring effect for preventing the occurrence of separation of embedded electrode particles 6*a* from the electrode layer 6. That is, in order to obtain a sufficient anchoring effect for each of the electrode particles 6*a* used, the largest-sized particles must be embedded more than half and thus the lower limit for the embedded depth $t_{6a}$ is determined to be 52 microns as a half of the diameter 104 microns of largest-sized particles used. From these considerations, the allowable range for the embedded depth of each of the electrode particles 6*a* used may be determined to be 52 to 62 microns. As will become clear later, since the electrode particles 6*a* are all provided to be in contact with the outer peripheral surface of the underlying rubber magnet layer 5, such a requirement for the embedded depth $t_{6a}$ may be automatically satisfied just by forming the electrode layer 6 having the thickness $t_6$ of such a range.

With such a structure as described above, since a magnetic field producing means is integrally formed in the developer carrier itself, there is no need to provide a separate magnet roll when the present developer carrier is assembled into a developing device as different from the prior art. Moreover, since the underlying layer 5 is comprised of a rubber material, the developer carrier may be made significantly light in weight and sufficiently elastic so that the present developer carrier contributes to provide an excellent developing characteristic at all times even if an image carrier which is rather rigid and carries thereon a latent image to be developed is used in rolling contact with the present developer carrier.

Figure 5:
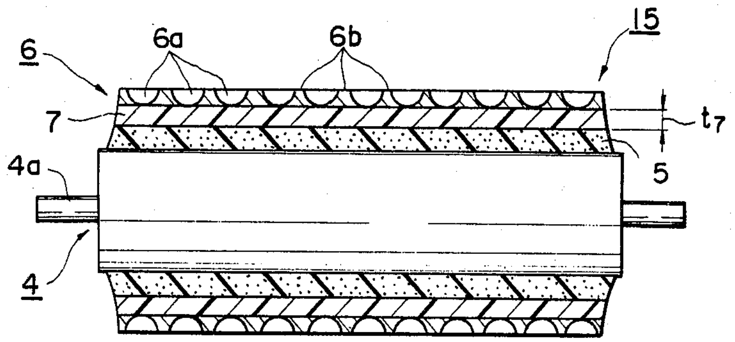
FIG. 5 is a longitudinal, cross-sectional view showing the overall structure of a developer carrier constructed in accordance with another embodiment of the present invention.
Figure 6:
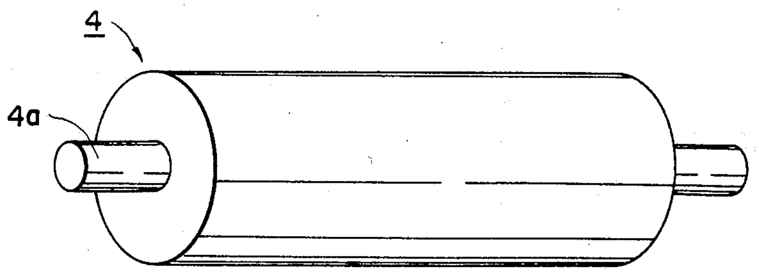
FIGS. 6, 7*a*–7*c*, 8*a* and 8*b*, 9–13, and 15–17 are schematic illustrations showing steps of a process for manufacturing the developer carrier shown in FIG. 3 according to one embodiment of the present invention.

FIG. 5 shows another developer carrier constructed in accordance with another embodiment of the present invention. This developer carrier 15 is fundamentally the same in structure as the previous developer carrier 12 shown in FIG. 3, excepting that an intermediate layer 7 is additionally provided as sandwiched between the rubber magnet layer 5 and the electrode layer 6.

Such a structure is particularly advantageous in the case where the rubber magnet layer 5 is comprised of a material whose dielectric constant is too high because the intermediate layer 7 may be comprised of another dielectric material to compensate the excessiveness in dielectric constant of rubber magnet layer 5. Thus, the intermediate layer 7 may be made from any desired material to any desired thickness $t_7$ in consideration of various factors.

Now, a process for manufacturing the developer carrier shown in FIG. 3 according to one embodiment of the present invention will be described step by step hereinbelow.

Figure 7A:
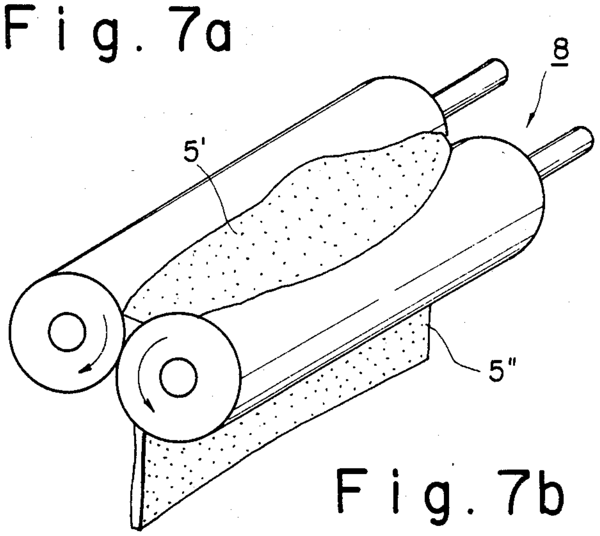
Figure 7B:
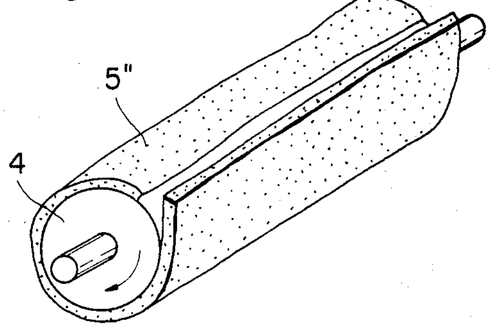
Figure 7C:
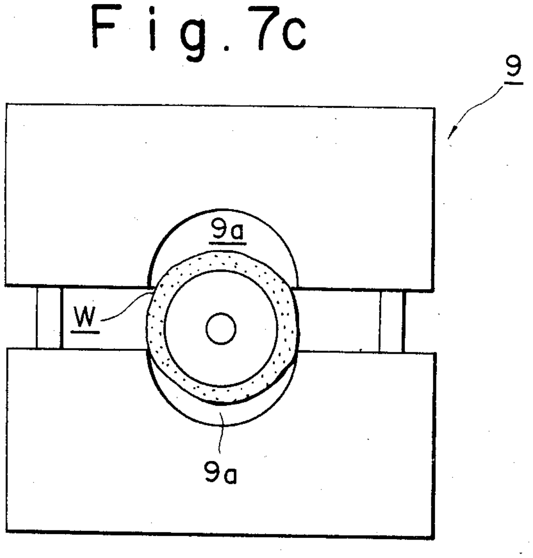
Figure 8A:
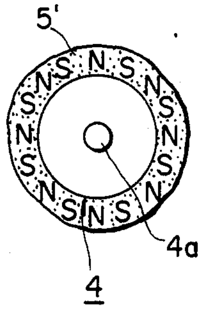
Figure 8B:
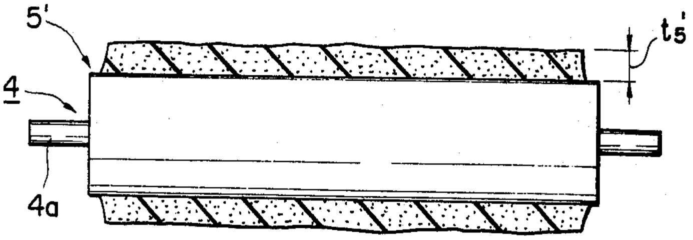

In the first place, there is prepared an electrically conductive roll 4 integrally provided with a pair of end shafts 4*a*, 4*a* each at each end face of the roll 4. After cleaning the outer peripheral surface of the roll 4, the rubber magnet layer 5 is formed thereon. As shown in FIG. 7*a*, a rubber material or NBR in the present embodiment is mixed with ferrite powder and, if desired, with a curing agent, and then the mixture 5' is passed between a pair of mixing rollers 8 in rotation thereby forming a sheet 5'' of rubber magnet material uniform in composition. Then, as shown in FIG. 7*b*, the sheet 5'' of rubber magnet material is placed around the roll 4, and, thereafter, the roll 4 wrapped with the sheet 5'' is put into a mold cavity 9*a* defined by a press mold 9. Under the condition, pressure and heat are applied to the press mold 9 to cure the sheet 5''. As a result, there is formed a rubber layer 5' having a substantially uniform thickness $t_5'$ on the peripheral surface of the roll 4, as shown in FIG. 8*b*. Then, the rubber layer 5' is magnetized by any well known method such that N and S poles are defined elongated in the axial direction and alternate at a predetermined pitch in the circumferential direction as shown in FIG. 8*a*.

Figure 9:
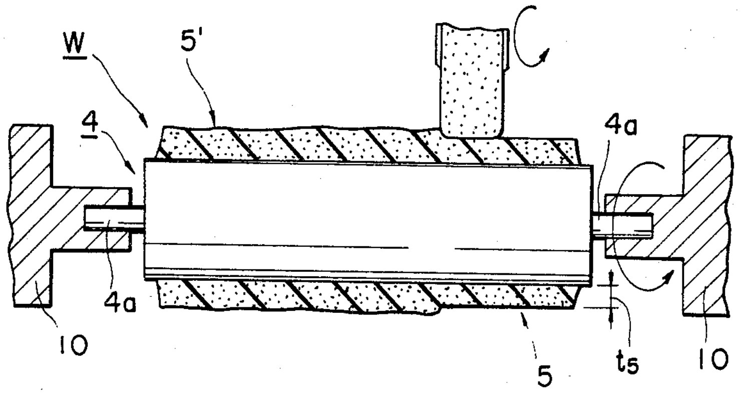

Then, the outer peripheral surface of the rubber magnet layer 5' is subjected to surface processing to make the outer surface smoother and the thickness $t_5'$ to be in a preferred range of 3 to 5 mm. In the present embodiment, as shown in FIG. 9, a cylindrical grinder is used to process the outer peripheral surface of the rubber magnet layer 5' so that in this case the original outer peripheral surface of the rubber magnet layer 5' is used as a reference in surface processing. As shown, a workpiece W is rotatably supported with the end shafts 4*a*, 4*a* of roll 4 securely held by holders 10, 10 of a cylindrical grinder, so that the rotating axis of the workpiece W is insured to coincide with the center axis of the roll 4 thereby allowing to form the rubber magnet layer 5 whose thickness $t_5$ is substantially uniform across the entire region without eccentricity.

Figure 10:
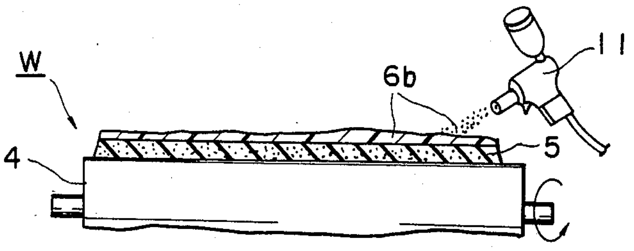
Figure 11:
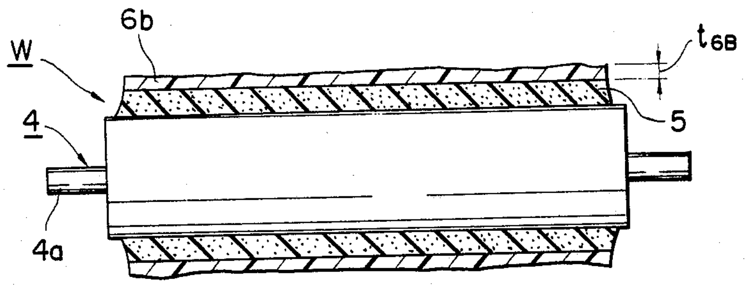

Then, after cleaning the processed outer surface of the rubber magnet layer 5, a first dielectric, adhesive agent 6*b*, preferably acrylicurethane, is applied to the outer surface of the rubber magnet layer 5, for example, by a compressed air type spray gun 11, while keeping the workpiece W in rotation as shown in FIG. 10. As a result, a film of first dielectric, adhesive agent 6*b* is formed on the rubber magnet layer 5 as shown in FIG. 11, but its thickness $t_{6B}$ is preferably controlled to be in a range between 3 and 15 microns if the copper electrode particles 6*a* to be applied in the next step have the diameter ranging between 74 and 104 microns for the reason which will become apparent from the following description. In the present embodiment, as shown in FIG. 10, the workpiece W is supported horizontally and set in rotation with the spray gun 11 being moved along the workpiece W in a reciprocating manner so as to form the layer of first adhesive agent 6*b* substantially uniform in thickness.

Figure 12:
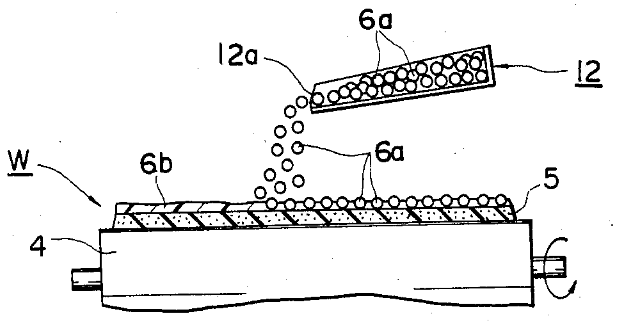
Figure 13:
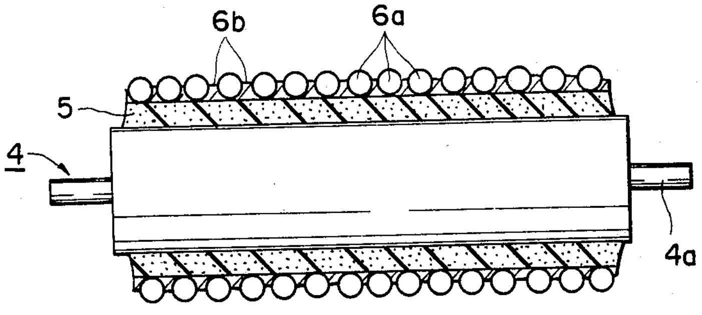

As soon as the layer of first adhesive agent 6*b* has been formed on the underlying layer 5 and before this layer hardens substantially, a plurality of copper electrode particles 6*a* are deposited to the first adhesive layer 6*b* by scattering as shown in FIG. 12. In the present embodiment, the copper electrode particles 6*a* of 74 to 104 microns in diameter are stored in a container 12 having a supply opening 12*a* at one end, and the container is moved as inclined in a reciprocating manner above the workpiece W which is held horizontally and in rotation so that the particles 6*a* drop by their own weight under the influence of gravity by a regulated amount thereby allowing to have the particles 6*a* deposited on the first adhesive layer 6*b* as scattered uniformly. In the preferred embodiment, the particles 6*a* are previously coated with an electrically insulating material, such as acrylic lacquer and methylmetaacrylate (MMA), in which case the copper particles 6*a* may remain electrically isolated from one another even if they are physically in contact when deposited on the first adhesive layer 6*b*. Of importance, since the copper particles 6*a* have the diameter ranging between 74 and 104 microns and the acrylicurethane adhesive layer 6*b* is relatively thin, i.e., 3 to 15 microns, the copper particles 6*a* become embedded in the adhesive layer 6*b* to come into contact with the outer surface of the underlying rubber magnet layer 5. The resulting structure is shown in FIG. 13, and, as shown, in accordance with the present process, the copper particles 6*a* may be properly positioned to be in contact with the outer peripheral surface of the rubber magnet layer 5 simply by having the copper particles 6*a* drop from the container 12 under the influence of gravity.

Figure 14:
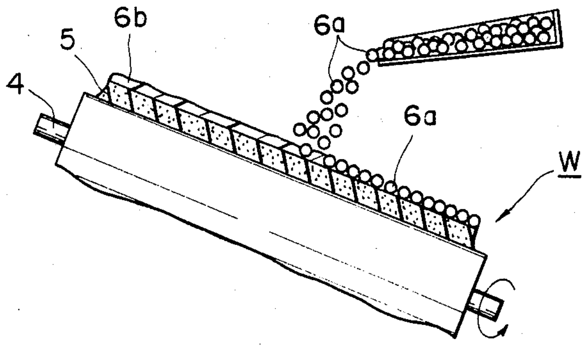
FIGS. 14, 18 and 19 are schematic illustrations showing several process modifications.
Figure 15:
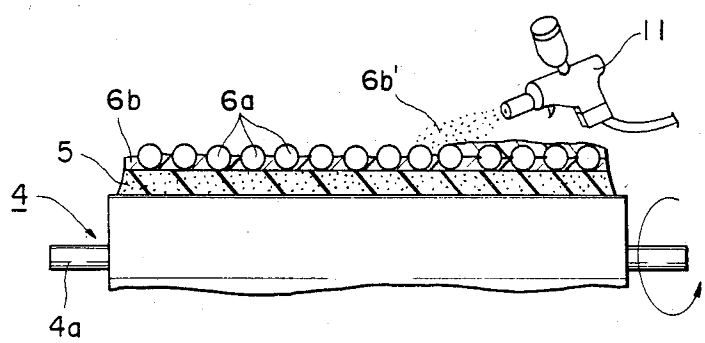

In the above-described embodiment, copper is used for the electrode particles 6*a*. However, any other electrically conductive material, such as bronze, phosphor bronze and stainless steel, may also be used to form the electrode particles 6*a*. If use is made of an electrically conductive material whose properties, in particular specific weight, are significantly different from those of copper, the thickness $t_{6B}$ of first adhesive layer 6*b* must be properly selected so as to insure that the electrode particles 6*a* may come to be properly located as being in contact with the outer surface of the underlying rubber magnet layer 5. As shown in FIG. 14, during the application of the electrode particles 6*a*, the workpiece W may be maintained inclined instead of being held horizontal. In this modified step, the density of deposited particles 6*a* may be increased.

After deposition of the electrode particles 6*a*, the first adhesive layer 6*b* is dried and hardened substantially completely. In this case, in order to expedite this hardening step, heat may be applied to the workpiece W or to the first adhesive agent 6*b*. For example, if use is made of a far-infrared light heater to apply heat externally, the workpiece W is set in rotation while being held horizontally, or a flow of heated air may be directed through the workpiece W, or the workpiece W may be put in an electrical furnace. It is to be noted, however, that heating is not by all means necessary in the present invention. For example, if use is made of a fast-drying type adhesive agent, the layer 6*b* becomes hardened sufficiently just by leaving it as it is for an appropriate length of time or directing a flow of air thereagainst.

When the first adhesive agent layer *6b* has hardened substantially, a second dielectric, adhesive agent *6b'* is applied to cover the deposited electrodes *6a* and hardened first adhesive layer *6b* using the spray gun 11 similarly with the step of FIG. 10. Preferably, the second adhesive agent *6b'* is identical in material to the first adhesive agent *6b;* however, they may be different as long as they can stick together sufficiently. In this manner, since the application of adhesive agent is carried out in two steps with a step of application of electrode particles *6a* carried out in between, the electrode particles *6a* may be properly located as embedded in the adhesive agent to be in contact with the outer peripheral surface of the underlying rubber magnet layer 5.

Figure 16:
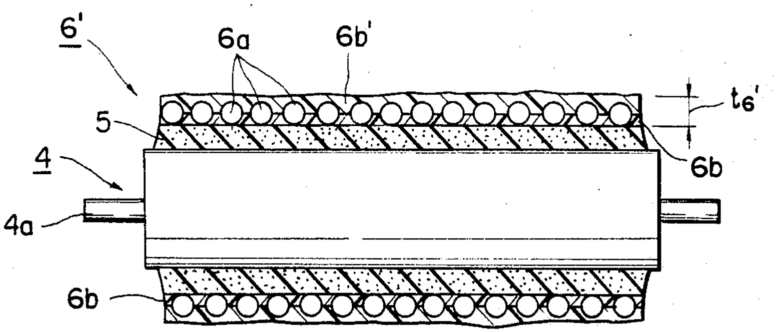

After formation of the second adhesive agent layer *6b'*, this layer is completely dried and hardened with or without application of heat as desired. As a result, as shown in FIG. 16, on the rubber magnet layer 5 is formed a to-be-formed electrode layer 6' including the first and second adhesive layers *6b* and *6b'* and the embedded electrode particles *6a*. Preferably, the to-be-formed electrode layer *6b'* is formed to have a thickness $t_6'$ of approximately 150 microns.

Figure 17:
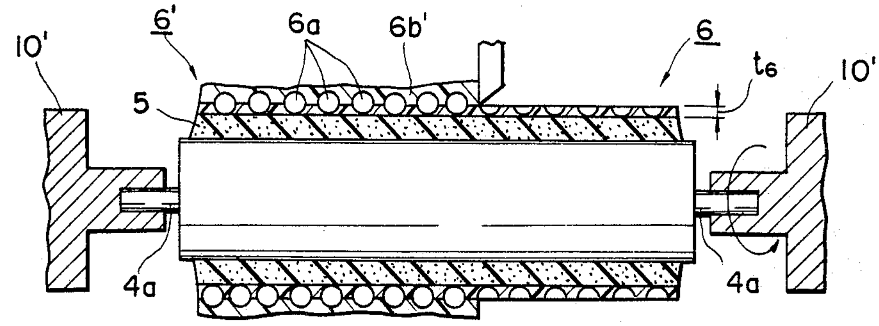
Figure 18:
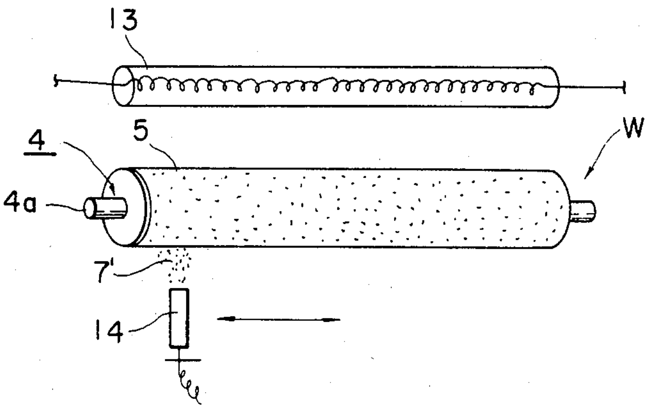
Figure 19:
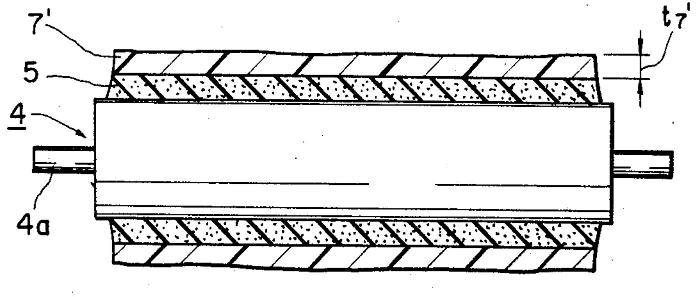

After formation of the to-be-formed electrode layer 6', its outer peripheral surface is processed as shown in FIG. 17 to remove a surface portion of the layer 6' thereby forming the electrode layer 6 of thickness $t_6$ while having each of the electrode particles *6a* partly exposed at the processed outer peripheral surface. In this step, the thickness $t_6$ is required to be in a range from 52 and 62 microns. As shown in FIG. 17, since the end shafts *4a, 4a* are grabbed by holders 10', 10' to keep the workpiece W in rotation while using a cutting tool to form the electrode layer 6 by removing a surface portion of the to-be-formed electrode layer 6', the workpice W may be rotated around the same axis at all times, the thickness $t_6$ of resulting electrode layer 6 may be easily controlled to be in a range between 52 and 62 microns. In other words, when carrying out the first surface processing as shown in FIG. 9, the end shafts *4a, 4a* are used to determine a rotating axis and similarly when carrying out the second surface processing as shown in FIG. 18, the end shafts *4a, 4a* are again used to determine a rotating axis. Thus, the workpiece W is always insured to rotate around the same rotating axis, which greatly contributes to control the resulting thickness $t_6$ to be in a desired range and uniform.

It is to be noted that the surface processing of to-be-formed electrode layer 6' may also be carried out by any other appropriate methods including super-finishing and centerless cylindrical grinding methods. Furthermore, in the case where the support 4 is in the form of an endless belt instead of a roll as in the above-described embodiment, the belt-shaped support may be extended around a plurality of rollers to advance in a predetermined direction with a cutting tool or a grinding stone in contact with a surface of the support.

Upon completion of surface processing of the to-be-formed electrode layer 6, the processed surface is cleaned to remove chips and cutting oil remaining thereon and thus there is obtained a developer carrier shown in FIG. 3 as a final product.

In the above-described embodiment, a step for magnetizing the rubber layer 5' has been carried out immediately after the formation of the rubber layer 5'. Alternatively, this magnetization step may also be carried out after surface processing the rubber layer 5', or after drying the second adhesive layer *6b'*, or after surface processing the to-be-formed electrode layer 6'. Considering the fact of possible deposition of debris after magnetization, it is preferable to carry out magnetization after drying the second adhesive layer *6b'*. It should also be noted that the application of adhesive agent has been carried out in two steps in the above-described embodiment, this may be carried out in a single step or more than two steps, if desired.

Now, a process for manufacturing the developer carrier of FIG. 5 having the intermediate layer 7 in accordance with another embodiment of the present invention will be described. This process is very similar to the above-described process in many respects excepting the presence of an extra step for forming the intermediate layer 7. A step for forming the intermediate layer 7 is illustrated in FIG. 18, and, as shown, the workpiece W including the rubber magnet layer 5 is held horizontally and kept in rotation and heat is applied using a far-infrared light heater 13. Then, based on an electrostatic spraying or painting method, an electrostatic spray gun 14 is used to apply dielectric powder 14, such as epoxy resin powder, to the workpiece W. In this case, the workpiece W is heated to a temperature which corresponds to a melting point of dielectric powder 7', or approximately 180° C. in the case of epoxy resin powder. The spray gun 14 is moved along the workpiece W while spraying the dielectric powder 7' and keeping the workpiece W in rotation. Thus, the dielectric powder 7' is uniformly applied to the workpiece W and when it is deposited on the workpiece W, it melts to form a uniform dielectric layer thereon. Although not shown specifically, the electrically conductive support roll 4 is connected to ground and a high voltage is applied to a charging electrode (not shown) provided in the spray gun 14 so that an electric field is created between the gun 14 and the workpiece W and the dielectric powder 7' becomes charged to a predetermined polarity as it is discharged out of the gun 14 thereby allowing the thus charged dielectric powder 7' to be securely deposited on the workpiece W as attracted electrostatically.

Even after spraying of dielectric powder 7', the workpiece W is continuously kept in rotation with the continued application of heat over a desired time period thereby causing the deposited and melted dielectric layer to sufficiently harden. When hardened in this manner, the resultant dielectric layer 7' is substantially uniform in thickness not only in the axial direction but also in the circumferential direction. After formation of the dielectric layer 7', the workpiece W is supported in a rotatable manner using its end shafts *4a, 4a*, and its surface is processed using a lathe or a cylindrical grinder thereby forming the intermediate layer 7 having a desired uniform thickness $t_7$ as shown in FIG. 5. And, then, if the electrode layer 6 is formed on the intermediate layer 7 similarly with the previously described process, there is obtained a developer carrier shown in FIG. 5 as a final product. It is to be noted that the intermediate layer 7 has been formed from a dielectric material in the above-described process; however, use may be made of any other material for forming the intermediate layer 7 in consideration of desired properties to be provided in the layer 7. Moreover, in the present process, the step of surface processing the rubber magnet layer 5 may be omitted, if desired.

While the above provides a full and complete disclosure of the preferred embodiments of the present invention, various modifications, alternate constructions and equivalents may be employed without departing from the true spirit and scope of the invention. For example, the application of adhesive agent may be carried out by any other method, such as dipping method. In addition, the intermediate layer 7 may be formed from a material, such as thermosetting polyimide and an ABS resin, and this material may be identical to or different from the material of first adhesive agent 6*b*. Therefore, the above description and illustration should not be construed as limiting the scope of the invention, which is defined by the appended claims.

What is claimed is:

1. A developer carrier for use in a developing device for developing a latent image by applying a film of developer as carried thereon, comprising:

an electrically conductive support;

a rubber magnet layer formed on said support to a first predetermined thickness, said rubber magnet layer including a mixture of a rubber material and magnetic powder, and said rubber magnet layer being magnetized in alternating polarities at a predetermined pitch in a predetermined direction;

an electrode layer formed on said rubber magnet layer to a second predetermined thickness, said electrode layer including a layer of dielectric, adhesive agent formed on said rubber magnet layer and a plurality of electrode particles embedded in said adhesive agent layer as electrically isolated from one another and partly exposed at an outer surface of said electrode layer.

2. The developer carrier of claim 1 wherein said support is in the form of a roll integrally provided with a pair of end shafts one at each end face of said roll.

3. The developer carrier of claim 2 further comprising an intermediate layer of third predetermined thickness provided as sandwiched between said rubber magnet and electrode layers.

4. The developer carrier of claim 3 wherein said intermediate layer is comprised of a dielectric material.

5. The developer carrier of claim 2 where said rubber material is acrylonitrile-butadiene rubber.

6. The developer carrier of claim 5 wherein said magnetic powder is ferrite powder.

7. The developer carrier of claim 2 wherein said rubber magnet layer is magnetized such that alternating N and S poles elongated axially in parallel with a center line of said roll are provided in a circumferential direction of said roll at a predetermined pitch.

8. The developer carrier of claim 7 wherein said electrode particles are embedded in said adhesive layer to be in contact with an outer surface of said rubber magnet layer.

9. The developer carrier of claim 8 wherein said electrode particles are defined by parts of substantially spherical electrode particles.

10. The developer carrier of claim 9 wherein said spherical electrode particles have the diameter in a range between 74 and 104 microns, and said second predetermined thickness is in a range between 52 and 62 microns.

11. The developer carrier of claim 10 wherein each of said electrode particles is comprised of an electrically conductive particle coated with an electrically insulating material.

12. The developer carrier of claim 11 wherein said electrically conductive material forming said electrode particles is selected from a group consisting of copper, bronze, phosphor bronze and stainless steel.

* * * * *